(12) United States Patent
Grimm et al.

(10) Patent No.: US 11,017,961 B2
(45) Date of Patent: May 25, 2021

(54) SAFETY SWITCH ARRANGEMENT

(71) Applicant: Euchner GmbH + Co. KG, Leinfelden-Echterdingen (DE)

(72) Inventors: Ilo Grimm, Waldenbuch (DE); Mike Gehrke, Hochdorf (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 0 days.

(21) Appl. No.: 16/774,031

(22) Filed: Jan. 28, 2020

(65) Prior Publication Data
US 2020/0258695 A1 Aug. 13, 2020

(30) Foreign Application Priority Data
Feb. 11, 2019 (EP) .................... 19156483

(51) Int. Cl.
*H01H 3/16* (2006.01)
*H01H 3/20* (2006.01)
*H01H 3/38* (2006.01)

(52) U.S. Cl.
CPC .............. *H01H 3/163* (2013.01); *H01H 3/20* (2013.01); *H01H 3/38* (2013.01)

(58) Field of Classification Search
CPC ............ H01H 3/163; H01H 3/20; H01H 3/38; H01H 27/007; H01H 3/161; H01H 9/286; H01H 3/022; F16P 3/08; F16P 3/10; E05B 47/0603; E05B 47/0002; E05B 2047/0067

USPC ............ 200/334, 43.01, 43.04, 43.05, 43.07, 200/43.11, 43.13, 318, 321, 323, 324, 200/325; 70/DIG. 30
See application file for complete search history.

(56) References Cited

U.S. PATENT DOCUMENTS

| 6,982,391 | B2 * | 1/2006 | Da Dalt | H01H 27/007 |
| | | | | 200/334 |
| 9,653,242 | B2 * | 5/2017 | Link | H01H 27/007 |
| 10,643,807 | B2 * | 5/2020 | Pizzato | H01H 27/002 |
| 2019/0112839 | A1 * | 4/2019 | Grimm | F16P 3/08 |

FOREIGN PATENT DOCUMENTS

| DE | 10360251 A1 | 7/2005 |
| DE | 102008060004 A1 | 5/2010 |
| EP | 1440930 A2 | 7/2004 |
| EP | 1795676 A2 | 6/2007 |

* cited by examiner

*Primary Examiner* — Edwin A. Leon
*Assistant Examiner* — Lheiren Mae A Caroc
(74) *Attorney, Agent, or Firm* — Michael Soderman

(57) ABSTRACT

A safety switch arrangement with a safety switch and an actuator associated with it. Moreover, a locking unit is provided for, by means of which the actuator is locked in a latched position. The safety switch has an auxiliary unlocking unit that has a mechanically actuatable actuating element. An actuation of the actuating element is implemented only with a transmission element as a positioning movement for the locking unit.

12 Claims, 4 Drawing Sheets

SAFETY SWITCH ARRANGEMENT

CROSS REFERENCE TO RELATED APPLICATIONS

This application claims the priority of EP 19156483.0 filed on 2019-02-11; this application is incorporated by reference herein in its entirety.

BACKGROUND

Such a safety switch arrangement generally comprises a safety switch with an associated actuator. The safety switch arrangement is generally used in the area of safety technology, i.e. in the area of machine safety. For use in the area of safety technology, especially in the area of personal protection, the safety switch arrangement must meet standards-compliance requirements with regard to fail-safety, such that it is ensured that an appropriately safe monitoring function can be executed using the safety switch arrangement. Such a safety switch arrangement can typically be used to secure access to a hazard area. For example, a safety switch arrangement can secure a lock of a movable barrier protective element, such as a safety door providing access to a hazard area. In this case, a hazardous system inside the hazard area can only be released for operation if the safety door is locked using the safety switch arrangement. The release of the system can be performed using a safety control unit to which safety-related control signals are transmitted.

For latching the safety door when the safety door is in its closed position, the actuator, in the form of a latch or similar, is brought into engagement with the safety switch by, for example, inserting the actuator into a recess of the safety switch. This latched position of the actuator is controlled by means of an RFID reader in the safety switch which detects a transponder in the actuator.

In addition, a lock can be provided, by means of which the actuator is locked in its latched position.

Such a safety switch arrangement is known, for example, from EP 17202141.

SUMMARY

The invention relates to a safety switch arrangement (1) with a safety switch (2) and an actuator (3) associated with it. Moreover, a locking unit is provided for, by means of which the actuator (3) is locked in a latched position. The safety switch (2) has an auxiliary unlocking unit (14) that has a mechanically actuatable actuating element (15). An actuation of the actuating element (15) is implemented only with a transmission element (16) as a positioning movement for the locking unit.

DETAILED DESCRIPTION

The invention is based on the problem of providing a safety switch arrangement of the aforementioned type that has a high level of functionality with low design expense.

For resolving this problem, the features of claim 1 are provided. Advantageous embodiments and useful further developments of the inventions are described in the dependent claims.

The invention relates to a safety switch arrangement with a safety switch and an actuator associated with it. Moreover, especially within the safety switch, a locking unit is provided by means of which the actuator is locked in its latched position. The safety switch has an auxiliary unlatching unit that has a mechanically actuatable actuating element. Actuation of the actuating element is converted into a positioning movement for the locking unit only by means of a transmission element.

The safety switch arrangement in accordance with the invention is used in the area of safety technology, i.e. in the area of machine safety.

Generally the safety switch arrangement is used to provide a safety function for a system or machine that is to be secured. In particular, the safety switch arrangement serves to secure access to a hazard area. The safety switch arrangement then serves to monitor a latching of a movable barrier protective element, such as for example a safety door, serving as access to the hazard area.

In this case, operation of a hazardous system is only released for use when the movable barrier protective element is latched, which is only the case when an actuator arranged on the movable barrier protective device is in a latched position at the safety switch, which is arranged in a stationary manner, such as on a frame part of the movable barrier protective device.

It is advantageous to monitor the latched position of the actuator by capturing signals from a transponder in the actuator with a reader unit of the safety switch.

Moreover, a locking unit that effects locking such that the actuator is held in the latched position is provided. To this end, it is advantageous if the locking unit holds a blocking element in its latched position, such that the actuator can no longer move out of its latched position. Operation of the system is then only released with the safety switch when the actuator is locked by the locking unit in the latched position. It is advantageous for the locking unit to be a component of the safety switch, i.e., for the former to be integrated within the latter.

The safety switch, in particular, its means for monitoring the latched position of the actuator and the locking unit, form electrically operating units. In the event of a power failure, they are no longer functional.

In this case, the latching of the actuator can no longer be released by means of these units. This has the effect, in particular, that the movable barrier protective element can no longer be opened, such that access to the hazard area is no longer possible.

According to the invention, in such cases a mechanically actuatable auxiliary unlocking unit is provided. An operator can release the actuator from the latched position by manually operating the auxiliary unlocking unit and also deactivate the locking effected by the locking unit, such that the movable barrier protective element then can be opened.

It is advantageous for the auxiliary unlocking unit to be constructed as an escape unlatching unit or emergency unlocking unit. If the locking of a movable barrier protective element serving as access to a hazard area is monitored with the safety switch arrangement and if the auxiliary unlocking unit is constructed as an escape unlatching unit, a user who is locked inside the hazard area can manually unlock the movable barrier protective element and exit the hazard area. With an auxiliary unlocking unit constructed as an emergency unlocking unit, a user can manually unlock the movable barrier protective element from the outside, i.e. outside the hazard area.

It is advantageous for the auxiliary unlocking unit to be constructed such that a mechanically actuatable actuating element is coupled only via a transmission element to the blocking element that effects the latching of the actuator, specifically such that an actuation of the actuating element is implemented as a preferably linear positioning movement of the transmission element, which is transmitted to the blocking element, whereby the blocking element releases the actuator, such that it can be manually released from the latched position. It is essential in this regard that various types of motions of the actuating element, on the one hand, and of the blocking element, on the other hand, can be implemented with the transmission element.

An essential advantage of the invention consists in that, due to the transmission element, the position of the actuating element is decoupled from the position of the blocking element.

By suitable dimensioning and guiding of the transmission element inside the safety switch, the position of the actuating element can be chosen freely and independently of the position of the blocking element. The actuating element can therefore be arranged at an advantageous position for an operator that is well accessible on the safety switch, wherein the actuating element can be arranged spatially separate from the blocking element.

Another advantage consists in a low construction expense for the auxiliary unlocking unit since coupling the actuating element to the locking unit, or especially advantageously, to the blocking element, requires only one transmission element. The number of components needed to realize the auxiliary unlocking unit can therefore be minimized.

It is especially advantageous for the transmission element to be a plastic injection molded part.

The transmission element can therefore be manufactured efficiently and cost-effectively. Moreover, the transmission element can be flexibly shaped.

This plastic injection molded part or the transmission element in general can have various segments that have different functions, such that this transmission element has a high degree of functionality.

In particular, a segment of the transmission element forms a push rod.

The push rod forms a unit with shear stiffness with which preferably linear positioning movements can be transmitted to the positioning element, such that by this means the positioning element can be released from a latched position, whereby the actuator can be released from its latched position.

It is further advantageous for a segment of the transmission element to form a film hinge that can be wound up or unwound on a shaft of the actuating element.

Due to the fact that upon actuation of the actuating element, the film hinge can be wound up and unwound upon it, the actuating element can, due to being shaped in the form of the shaft, have a compact, space-saving construction. In particular, there need not be any additional space provided for the actuating element to execute linear positioning movements.

Coupling the transmission element with the film hinge to the actuating element therefore represents a simply designed and space-saving construction.

So that shear forces can be transmitted to the push rod upon winding up the film hinge, the film hinge itself has sufficient shear stiffness.

It is especially advantageous for a face of the shaft on the safety switch to be open and have an interface for engaging a tool by means of which the shaft can be rotated about its longitudinal axis.

In the simplest case, the interface consists of a slot in which a screwdriver can be inserted in order to turn the shaft and wind the film hinge up or out.

In general, winding up or winding out the film hinge on the shaft generates a linear motion of the push rod, which motion is transmitted to the locking unit.

Depending on the construction of the locking unit, it can be released from its latched and locked position by pulling forces upon winding up the film hinge, or shear forces upon winding out the film hinge, being exerted upon the locking unit by the transmission element.

According to another advantageous further development, a segment of the transmission element is a spring element.

This spring element forms an overload protector such that excessive tension forces on the push rod are avoided. In this way, malfunctions of or damage to the auxiliary unlocking unit are avoided.

According to another advantageous further development, a segment of the transmission element is a latching element. In an end position of the push rod of the transmission element, the latching element is latched in in a latching recess of the safety switch.

Latching in the latching element into the latching recess gives an operator actuating the actuating element haptic feedback when the end position of the push rod is reached. In this way, over-rotating of the actuating element and thereby ensuing damage to the auxiliary unlocking unit is avoided in a simple manner.

BRIEF DESCRIPTION OF THE DRAWINGS

The invention is explained below based on the drawings. The following is shown.

DETAILED DESCRIPTION OF THE PREFERRED EMBODIMENTS

Figure 1A:
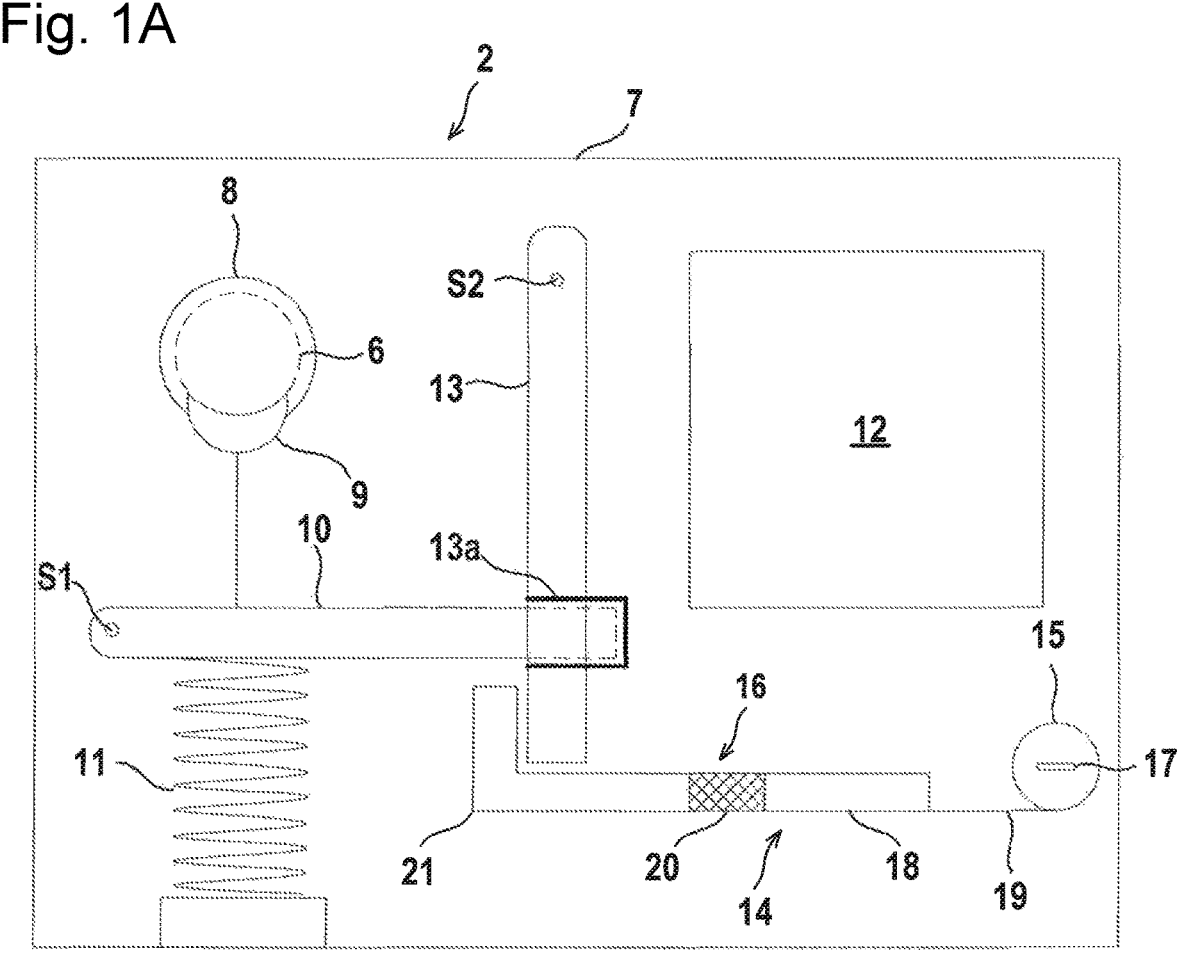
FIG. 1A: First example of the inventive safety switch arrangement with a safety switch and an actuator wherein the actuator is locked in a latched position.
Figure 1B:
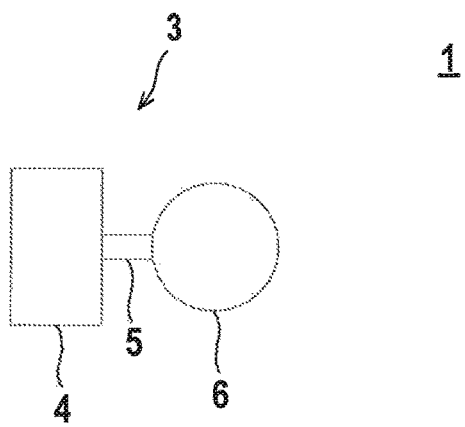
FIG. 1B: Individual representation of the actuator of the safety switch arrangement in accordance with FIG. 1A.

FIGS. 1A and 1B show schematically an exemplary embodiment of a safety switch arrangement 1 with a safety switch 2 and actuator 3.

This safety switch arrangement 1 can be used, for example, to secure a safety door that serves as access to a hazard area. The actuator 3 can be arranged on the door, the safety switch 2 can be arranged on a frame bounding the door opening which is closed by the safety door.

As is evident from FIGS. 1A and 1B, the actuator 3 has a core body 4 in which a connecting element 5 is mounted. The connection element 5 is formed by an elongated body, the cross section of which is at least approximately constant over its entire length.

An actuator head 6 is borne on the connection element 5. In the present case, the actuator head 6 is designed to be spherically shaped, which is not compulsory, however. The actuator head 6 has a larger cross-sectional area than the connection element 5.

The components of the safety switch 2 are integrated into a housing 7.

On a side wall of the housing 7 of the safety switch 2, an opening 8 is provided into which a cavity in the safety switch 2 opens up, into which cavity the actuator head 6 can be inserted such that the actuator 3 is then in its latched position.

To detect the latched position, a transponder (not shown) is provided within the actuator head 6. If the actuator head 6 is in the latched position, signals stored in the transponder can be read out by a reader unit integrated within the safety switch, whereby the latched position is detected.

The opening 8 is circular in shape, wherein its diameter is somewhat larger than the diameter of the actuator head 6.

The opening 8 is associated with a blocking element 9 that is borne on a rocker 10 that can be pivoted about a pivot axis S1.

FIG. 1A shows the blocking element 9 in its latched position, in which it projects into the opening 8. When the actuator head 6 is inserted into the opening 8, the blocking element 9 is pushed downward and thereby the rocker 10 is pushed downward against the spring force of a spring 11.

Once the actuator 3 has been inserted into the cavity, the rocker 10 is again pushed upward by the spring 11, such that the blocking element 9 is again moved into the latched position, in which the blocking element 9 projects into the opening 8.

The safety switch 2 has a locking unit by means of which a locking of the blocking element 9 in its latched position can be effected, wherein the actuator 3 is latched in its latched position.

In the present case, the locking unit consists of a hinged armature solenoid 12 and an anchor in the form of a pivoting lever 13 that is pivotable about a pivot axis S2.

With the locking unit, a locking of the actuator 3 in the latched position is effected by the hinged armature solenoid 12 generating a magnetic field that holds the pivoting lever 13 in the blocked position shown in FIG. 1A, in which the free end of the rocker 10 engages in a recess 13a of the pivoting lever 13, such that the blocking element 9 is securely held in its latched position.

A system, especially a system arranged inside a hazard area, is controlled using the safety switch arrangement 1. The safety switch 2 generates a release signal for releasing operation of the system only if the actuator 3 is detected in its latched position and if a locking of the actuator 3 in the latched position is effected by the locking unit.

According to the invention, the safety switch 2 has an auxiliary unlocking unit 14. Using the auxiliary unlocking unit 14, the locking of the actuator can be cancelled, for example during a power failure, such that the actuator 3 can be released from its latched position.

The auxiliary unlocking unit 14 has an actuating element 15 and a transmission element 16 that couples the actuating element 15 to the blocking element 9. The actuating element 15 essentially consists of a cylindrical shaft that is borne rotatably with one end face inside the housing 7. The second end face lies exposed at a wall of the housing 7. A slot 17 is worked into this face, into which slot a screwdriver can be inserted in order to rotate the shaft about its longitudinal axis.

The transmission element 16 consists of a plastic injection molded part that has multiple segments that have various functionalities. A first segment forms a push rod 18 as a shear-resistant element for transmitting linear positioning movements, which in particular serve to release the blocking element 9 from the latched position. Furthermore the transmission element 16 has a film hinge 19 that can be wound up and wound out on the shaft. The film hinge 19 itself also has shear stiffness, such that it can be used to transmit protective motions onto the push rod 18.

As protection against mechanical overload, the transmission element 16 has a spring element 20 as an additional segment.

Finally, a segment (not shown) of the transmission element 16 forms a latching element that in an end position of the push rod 18 of the transmission element 16 is latched within a latching recess of the safety switch 2.

Figure 2:
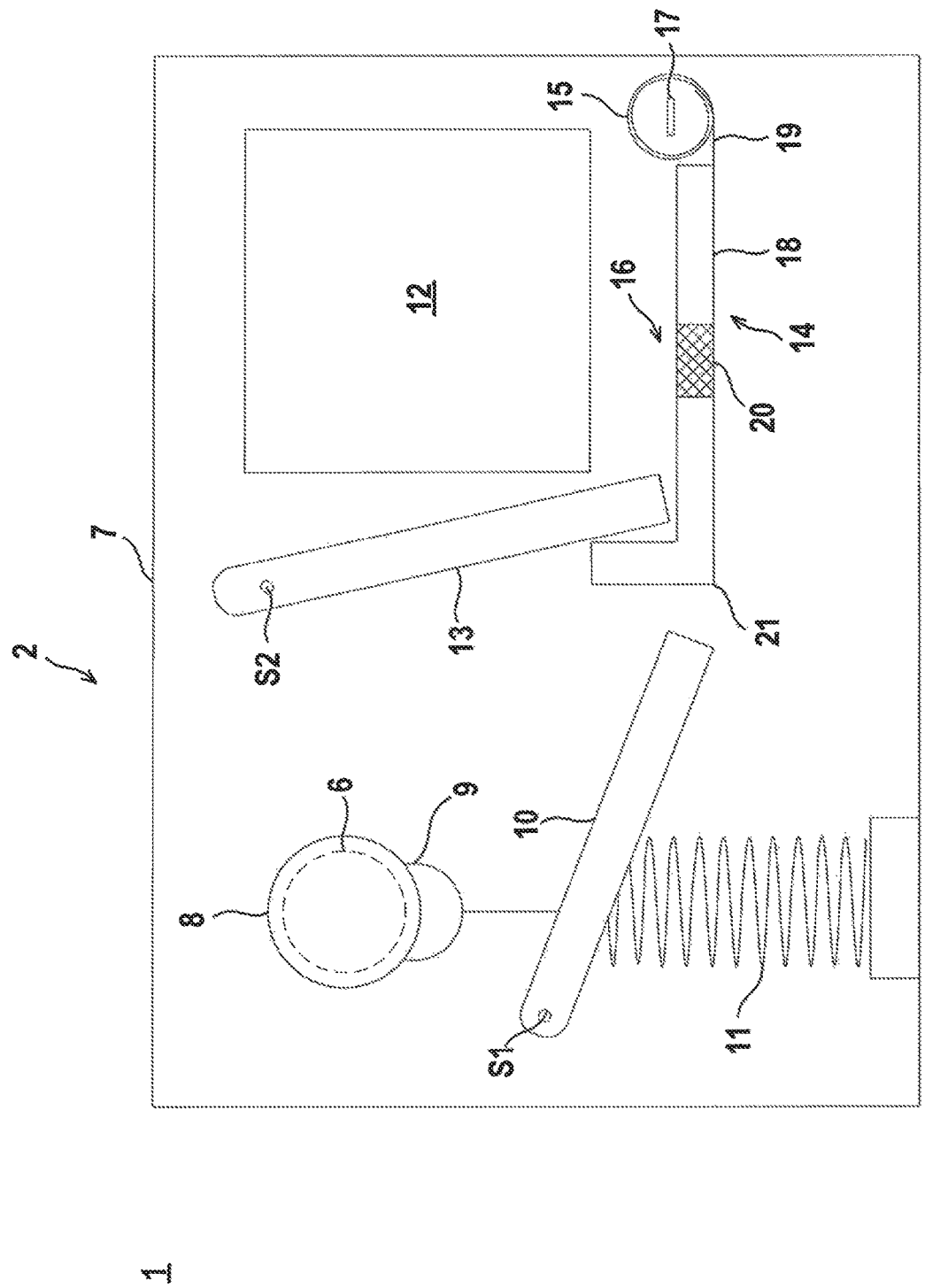
FIG. 2: Arrangement according to FIG. 1A in which the locking of the actuator is cancelled by means of an auxiliary unlocking unit.

By latching the latching element in the latching recess, the operator who actuates the actuating element 15 receives haptic feedback if the push rod 18 is in the end position shown in FIG. 2.

The free end of the transmission element 16 forms a hook 21, which abuts the free end of the pivoting lever 13 of the locking unit. If the auxiliary unlocking unit 14 is not actuated, i.e., the film hinge 19 is wound out from the shaft, the hook 21 of the transmission element 16 abuts the pivoting lever 13 without appreciable contact force, such that the latter remains in its blocked position shown in FIG. 1A, in which the pivoting lever 13 effects the locking of the blocking element 9.

The auxiliary unlocking of the blocking element 9 occurs in that an operator actuates the actuating element 15, i.e. using a screwdriver, rotates the shaft such that the film hinge 19 is wound up on the shaft, such that the transmission element 16 pulls the pivoting lever 13 out of its blocked position (FIG. 2). Accordingly, the rocker 10 is free and the actuator head 6 can be pulled out of the cavity of the safety switch 2, wherein once again here the blocking element 9 is pushed downward against the spring force.

Figure 3:
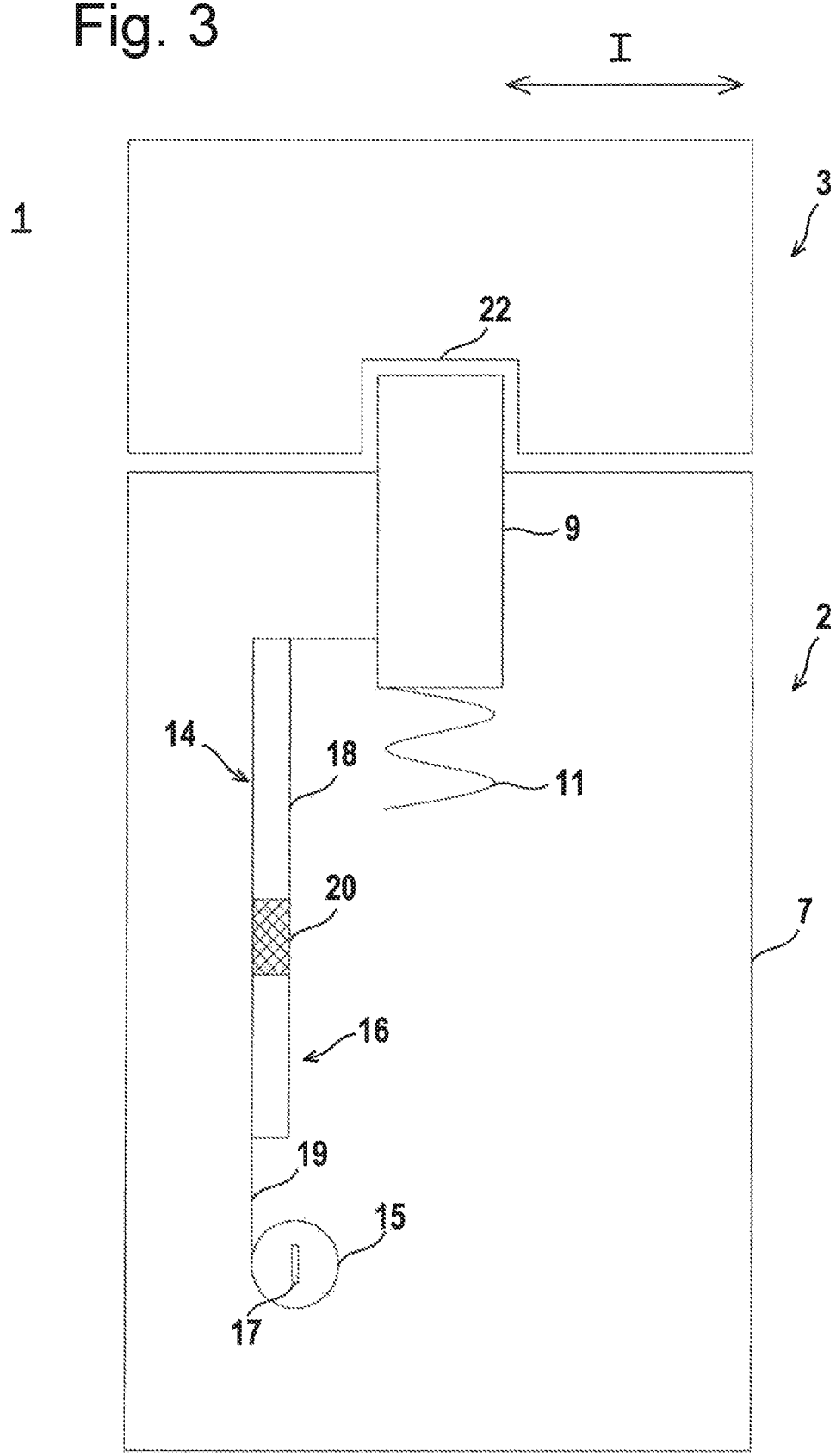
FIG. 3: Second example with a safety switch and an actuator, wherein the actuator is locked in a latched position.
Figure 4:
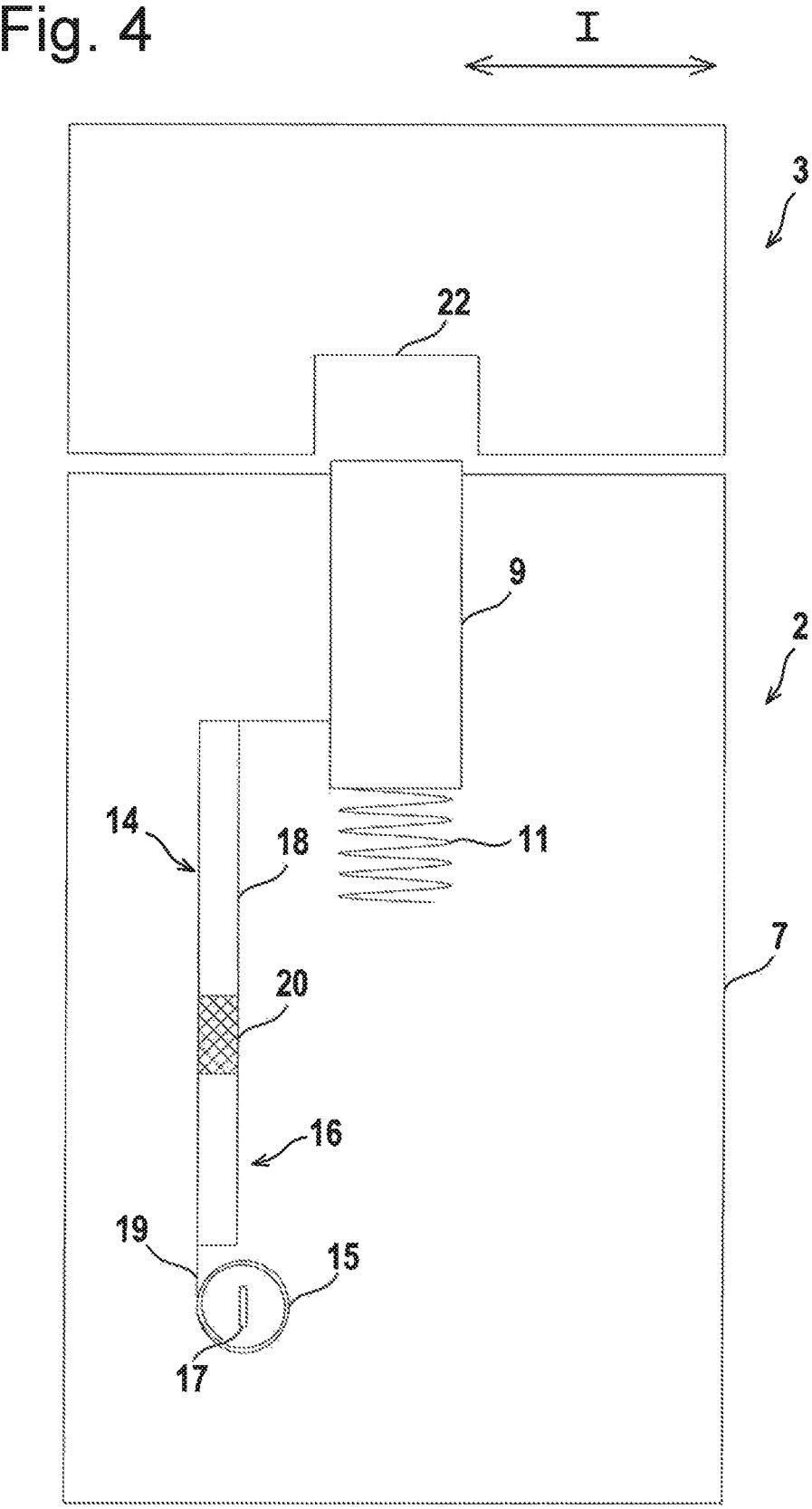
FIG. 4: Arrangement according to FIG. 3 in which the locking of the actuator is cancelled by means of an auxiliary unlocking unit.

FIGS. 3 and 4 show another exemplary embodiment of the safety switch arrangement 1 according to the invention. The actuator 3 borne on a safety door or similar can be moved relative to the safety switch 2 by moving the safety door in the direction of motion indicated by the arrow I. FIGS. 3 and 4 show the actuator 3 in the latched position.

A blocking element 9 in the form of a locking bolt is provided as a locking unit that can be displaced in the longitudinal direction of the safety switch 2 by means of a drive unit (not shown). FIG. 3 shows the locking bolt in activated locking. The locking bolt is in its latched position and protrudes beyond the face of the housing 7 of the safety switch 2 and projects into a recess 22 of the actuator 3, by means of which the latter is locked in its locked position. The locking bolts are held in the latched position by the spring force of a spring 11. The locking bolt is associated with an auxiliary unlocking unit 14, the construction of which correspondents to that of the auxiliary unlocking unit 14 in FIGS. 1 and 2, i.e. the auxiliary unlocking unit 14 has an actuating element 15 and a transmission element 16, wherein in this case the free end of the transmission element 16 is fastened to the locking bolt or can be brought to so engage.

FIG. 3 shows the status when the auxiliary unlocking is not actuated.

FIG. 4 shows the auxiliary unlocking that is effected by actuating the actuating element 15 and winding up the film hinge 19 onto the shaft. In so doing, the auxiliary unlocking unit 14 pulls the locking bolt back out of the locked position, against the spring force of the spring unit such that the locking bolt is inserted into the safety switch 2. The actuator 3 can then be moved out of its latched position.

Naturally, the principle of auxiliary unlocking illustrated in the figures can also be applied to other designs of safety switches.

LIST OF REFERENCE NUMERALS (1) Safety switch arrangement
(2) Safety switch
(3) Actuator
(4) Core body
(5) Connection element
(6) Actuator head
(7) Housing
(8) Opening
(9) Blocking element
(10) Rocker
(11) Spring
(12) Hinged armature solenoid
(13) Pivoting lever
(13a) Recess
(14) Auxiliary unlocking unit
(15) Actuating element
(16) Transmission element
(17) Slot
(18) Push rod
(19) Film hinge
(20) Spring element
(21) Hook
(22) Recess
S1, S2 Pivot axis
I Direction of motion

The invention claimed is:

1. A safety switch arrangement (1) with a safety switch (2) and an actuator (3) associated with said safety switch arrangement, wherein the actuator is locked in a latched position by a locking unit, characterized in that the safety switch (2) has an auxiliary unlocking unit (14) that has a mechanically actuatable actuating element (15), wherein an actuation of the actuating element (15) is implemented only with a transmission element (16) as a positioning movement for the locking unit, and wherein a segment of the transmission element (16) forms a film hinge (19) that can be wound up or wound out on a shaft of the actuating element (15).

2. The safety switch arrangement (1) according to claim 1, characterized in that the locking unit is constructed to hold a blocking element (9) in a latched position, whereby the actuator (3) is locked in the latched position by means of the blocking element (9) held in the latched position.

3. The safety switch arrangement (1) according to claim 2, characterized in that the locking unit forms an electrically operating unit.

4. The safety switch arrangement (1) according to claim 2, characterized in that the locking unit is a component of the safety switch (2).

5. The safety switch arrangement (1) according to claim 2, characterized in that the position of the actuating element (15) is decoupled from the position of the blocking element (9) by the transmission element (16).

6. The safety switch arrangement (1) according to claim 1, characterized in that the transmission element (16) is a plastic injection molded part.

7. The safety switch arrangement (1) according to claim 1, characterized in that a segment of the transmission element (16) forms a push rod (18).

8. The safety switch arrangement (1) according to claim 1, characterized in that an end face of the shaft lies freely at the safety switch (2) and has an interface to insert a tool by means of which the shaft is rotatable about its longitudinal axis.

9. The safety switch arrangement (1) according to claim 1, characterized in that by winding up or winding out the film hinge (19) on the shaft, a linear motion of a push rod (18) is generated, which is transmitted to the locking unit.

10. The safety switch arrangement (1) according to claim 1, characterized in that a segment of the transmission element (16) is a spring element (20).

11. The safety switch arrangement (1) according to claim 1, characterized in that a segment of the transmission element (16) is a latching element.

12. The safety switch arrangement (1) according to claim 1, characterized in that the latched position of the actuator (3) is monitored by recording signals from a transponder in the actuator (3) into a reader unit of the safety switch (2).

* * * * *